(12) United States Patent
Gehrig et al.

(10) Patent No.: US 9,016,294 B2
(45) Date of Patent: *Apr. 28, 2015

(54) UNIT OF WASHING FOR MACHINE OF CLEANING OF OPHTHALMIC GLASSES OR OTHER SUBSTRATES

(71) Applicant: Special Coating Laboratory International, Archamps (FR)

(72) Inventors: Jean Gehrig, Viry (FR); Denis Gehrig, Saint Julien en Genevois (FR)

(73) Assignee: Special Coating Laboratory International (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/828,245

(22) Filed: Mar. 14, 2013

(65) Prior Publication Data

US 2013/0199584 A1 Aug. 8, 2013

Related U.S. Application Data

(63) Continuation of application No. 11/918,844, filed on Feb. 9, 2009, now Pat. No. 8,430,109.

(51) Int. Cl.
| | |
|---|---|
| *B08B 3/12* | (2006.01) |
| *B08B 6/00* | (2006.01) |
| *B08B 3/02* | (2006.01) |
| *B05B 1/04* | (2006.01) |

(52) U.S. Cl.
CPC . *B08B 3/02* (2013.01); *B05B 1/044* (2013.01); *B05B 1/042* (2013.01)

(58) Field of Classification Search
None
See application file for complete search history.

(56) References Cited

U.S. PATENT DOCUMENTS

| 3,083,718 | A | * | 4/1963 | Heinicke | 134/111 |
| 6,394,285 | B1 | * | 5/2002 | Arthurs et al. | 211/41.9 |
| 2004/0020520 | A1 | * | 2/2004 | Kim et al. | 134/95.2 |

* cited by examiner

*Primary Examiner* — Jason Ko
(74) *Attorney, Agent, or Firm* — The Weintraub Group, P.L.C.

(57) ABSTRACT

A washing unit for machines that clean ophthalmic glass (1) or other substrates. It includes, on one hand, two washing lines (22, 23), each able to issue a high-pressure jet of washing liquid in a flared shape of a width substantially equal to or greater than the diameter of the glass to be cleaned, said lines (22, 23) being parallel and mounted opposite each other on each side of the glass (1) to be cleaned so that the two streams of liquid (30) are located at the same level and come into contact on the concave (10) and convex (11) surfaces respectively of said glass (1); and, on the other hand, supports (4) intended to hold the glass (1) in a stable position during the washing operation and the means (2') to allow movement of said lines (22, 23) or the glass (1) in order to perform simultaneous bathing of the concave (10) and convex (11) surfaces of the glass by the respective strains of washing liquid (30).

6 Claims, 3 Drawing Sheets

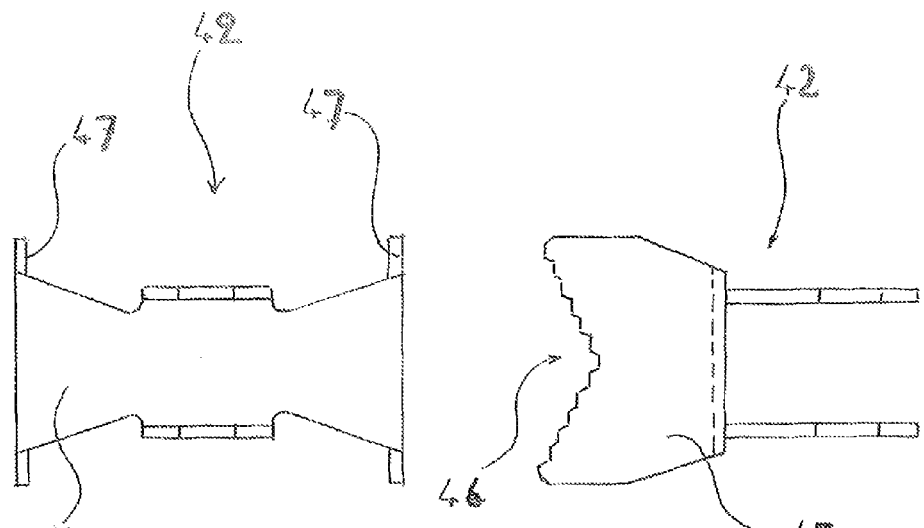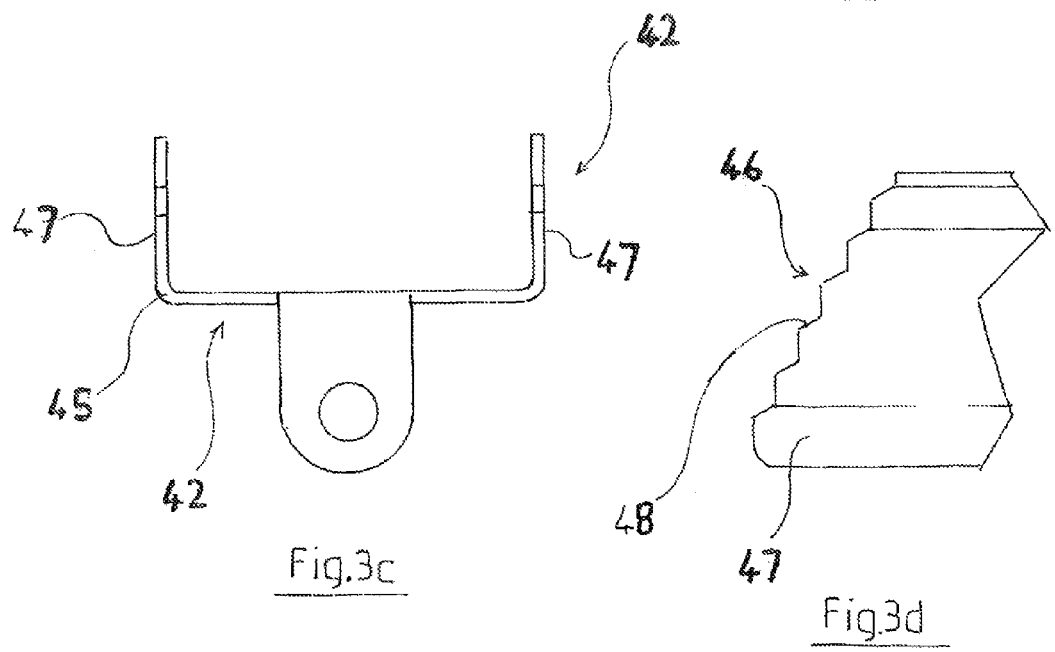

UNIT OF WASHING FOR MACHINE OF CLEANING OF OPHTHALMIC GLASSES OR OTHER SUBSTRATES

The object of this invention is to create a washing unit for machines that clean ophthalmic glass or other substrates.

Currently, ophthalmic glass is cleaned manually or automatically using rotating brushes in the form of washing units mounted on the chassis of a machine that can store a number of glasses to be washed and direct them towards the various washing and drying units using a means of transport.

However, the passage of the bristles of the brushes over the convex and concave surfaces of the ophthalmic glass to be cleaned causes many scratches, in particular when they are in contact with organic glass made from heat-hardened resins.

The purpose of this invention is to remedy these disadvantages by offering a washing unit for machines that clean ophthalmic glass, allowing improved productivity in washing such glass and cleaning their concave and convex surfaces with greater efficiency and without scratching them.

A washing unit for machines that clean ophthalmic glass according to this invention includes, on one hand, two washing lines, each able to issue a high-pressure jet streams of washing liquid ejected in a flared shape of a width substantially equal to or greater than the diameter of the glass to be cleaned, said lines being parallel and mounted opposite each other on each side of the glass to be cleaned so that the two jet streams of liquid are located at the same level and come into contact with the concave and convex surfaces of said glass respectively; and, on the other hand, a means of support intended to hold the glass in a stable position during the washing operation and also intended to allow positioning of said jet streams or the glass in order to perform simultaneous bathing of the concave and convex surfaces of the glass by their respective streams of washing liquid.

In a preferred embodiment of this invention, the jet of washing liquid coming from each line shall be obtained as a result of several jets of liquid forming a flared stream projected by sprayers placed on a single line and regularly spaced with an interval between the sprayers delineated in such a manner that the liquid streams overlap on contact with the glass to obtain a single stream of liquid of a width substantially equal to or greater than the diameter of the glass to be cleaned.

The lines shall move simultaneously in rotation or displacement parallel to the glass to be cleaned, and shall be, for example, joined perpendicular to a vertical pole mounted in rotation around their axis.

In a preferred embodiment of this invention, each line shall have a high-pressure distribution chamber for the washing liquid and the vertical pole shall have a channel for sending the washing liquid under high pressure into said distribution chambers.

The glass shall be maintained horizontally in a fixed washing position between the two lines with the aid of a tightening clamp made up of two calipers able to be moved away from or closer to each other to hold the glass firmly during washing. The tightening caliper for holding the glass may consist of a lever arm that has, on one of its extremities, a clamp made from a metal plate folded into a U-shape, with a V-shaped notch placed on the side extremity of each branch of said U to accept the edge of the glass 1. The edge of the notches shall be appropriately cut in a saw-tooth manner in order to improve locking of the edge of the glass in these notches.

The glass will thus be held in a fixed position by the pincers during the cleaning operation and the opposing forces exerted simultaneously on the concave and convex faces of the glass by the two opposing liquid streams aimed toward it will reinforce the stability of the glass and prevent it from being ejected from the clamp or being broken under the force of the high-pressure liquid.

The advantages and the characteristics of this invention are more clearly described below and refer to the attached design, which represents an non-limiting embodiment.

FIG. 3a represents a lateral view of a clamping handle for grasping the glass by the tightening clamp in the washing unit according to this invention.

FIG. 3b represents a vie from below of a clamping handle

FIG. 3c represents a profile view of a clamping handle

Figure 1:
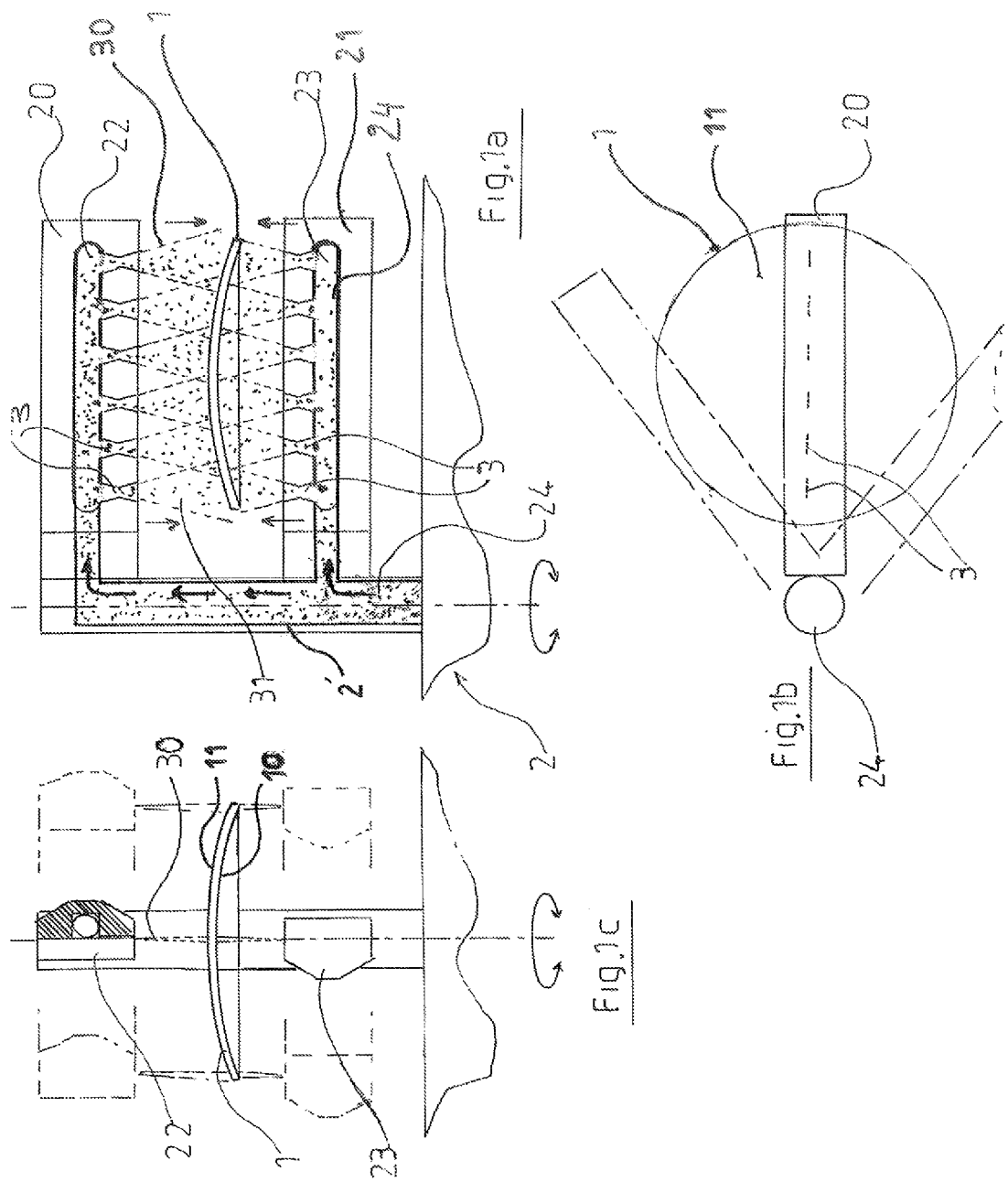
FIG. 1a represents a profile view of a washing unit for ophthalmic glass according to this invention
FIG. 1b represents a view of the washing unit from above according to this invention
FIG. 1c represents a cross-cut view of the washing unit according to this invention.

FIG. 3d represents a detailed view of the contact edge of a V-shaped notch of a clamping handle On referring to FIGS. 1a, 1b, 1c, one can see that a washing unit for ophthalmic glass 1 according to this invention consists of a boom 2 comprising a 2' vertical pole with two horizontal arms, upper 20 and lower 21, facing each other and each supporting respectively a line 22, 23 of sprayers projecting high-pressure washing liquid 24 in a flared shape onto the ophthalmic glass 1 positioned horizontally between the two spray lines 22 and 23.

Each line 22, 23 holds a row of sprayers 3 projecting jets of high-pressure liquid (30) in the shape of a flare with the function of washing respectively one of the concave 10 or convex 11 surfaces of the glass 1 to be cleaned.

The 2' vertical pole of the boom 2 of the washing unit is mounted in rotation around its axis in such a way to be able to move the two ramps 22, 23 at an angle and simultaneously, within the horizontal plane parallel to that of the glass to be cleaned.

The number and spacing of the sprayers is determined so as to obtain a ray of streams of liquid 30 covering the corresponding concave 10 or convex 11 surface of the glass 1, forming a curtain of water resulting from the juxtaposition of the liquid streams 30, and of a width substantially equal to or greater than the diameter of the glass 1 that is located at an appropriate distance from the sprayers 3 as a function of the parameters of pressure and speed from the liquid streams 30.

Thus, the cleaning of the concave 10 and convex 11 surfaces of glass 1 is done by angular movement of lines 22, 23, moving in rotation around the axis of the vertical pole 2 and having the effect of simultaneously moving the two opposite curtains 31 of streams of washing liquid 30 and bathing the entire surface of the two respective concave 10 and convex 11 surfaces of the glass 1.

Tests have shown that to eliminate all contamination on the surface of ophthalmic glass, the washing liquid projected at the exit of each sprayer 3 must hit the surface of the glass at a pressure of 8 to 30 bars and a speed on order of 200 km/hr, requiring a high outflow of 30 to 50 L/minute.

Figure 2:
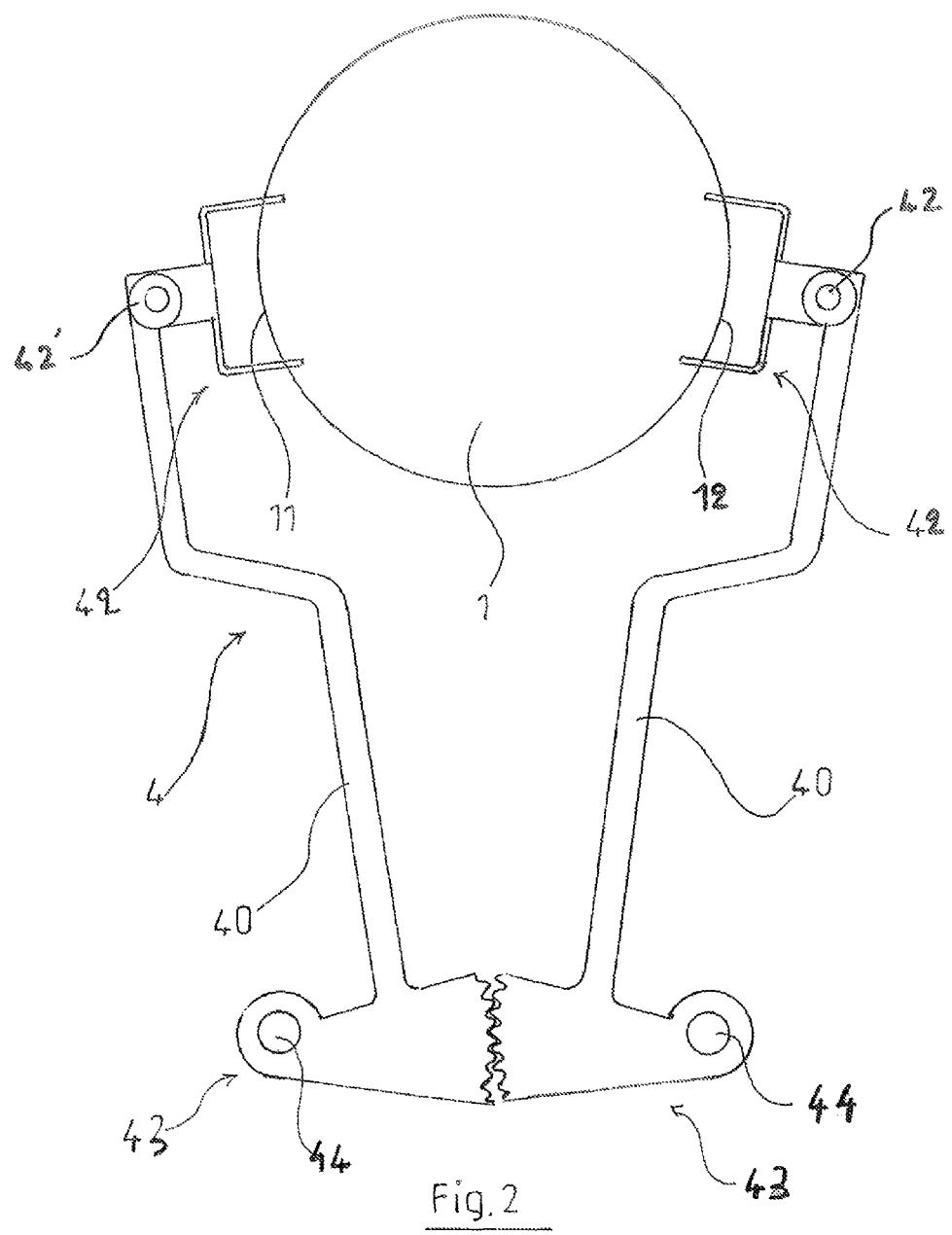
FIG. 2 represents a profile view of a tightening clamp for holding the glass in a washing unit according to this invention

The glass 1 is maintained in a fixed horizontal position for washing between the two lines 22, 23, with the aid of a tightening clamp 4, which can be seen on FIG. 2, comprising two calipers 40, which can be moved closer to hold the glass 1 firmly on its peripheral edge 12 during the washing.

A tightening caliper 40 for the glass 1 is comprised of a lever arm 41 having a clamp 42 at one end and a foot 43 at the other end that can be mounted in rotation around an axis 44 and articulated by gears to the foot 43 of the other arm 41 in order to allow pivoting of the two arms 41, one in relation to the other, to push away the clamps 42 or bring them closer for holding the glass 1 no matter what its diameter. The clamps 42 can be regulated at an angle by being mounted so that they pivot around a 42' axis, allowing adaptation of the tightening of the glass 1 according to its diameter.

FIGS. 3a, 3b, 3c and 3d show that a clamp 42 is made of a metal plate 45 folded in a U-shape and a V-shaped notch 46 is made at the end of each branch 47 of the U to receive the peripheral edge 12 of the glass 1. FIG. 3a shows that the edge of the brackets 46 is cut in a saw-tooth manner 48 in order to strengthen the locking of the edge of the glass 1 in the notches 46.

The opposing forces created by the contact of the two streams of liquid from opposite directions on the two surfaces, concave and convex, of the ophthalmic glass, according to this invention, provide reinforcement of the stability of the glass through a balance of forces and avoid the glass being ejected from the tightening clamp holding it or being broken by the pressure and high speed of the washing jets.

The invention claimed is:

1. A washing unit for machines that clean ophthalmic glass (1) or other substrates is characterized by:
   (a) two washing lines (22, 23), each line comprising a plurality of linearly aligned sprayers (3), each line able to issue a high-pressure jet of overlapping washing liquid sprays (30) in a flared shape having a width substantially equal to or greater than the diameter of the glass to be cleaned, said lines (22, 23) being parallel and mounted opposite each other one on each side of the glass (1) to be cleaned such that the two streams of liquid (30) are located at the same level and come into contact on the concave (10) and convex (11) surfaces, respectively, of said glass (1),
   (b) supports (4) for holding and grasping the glass in a stable position during the washing operation, the glass being maintained horizontally in a fixed washing position between the two lines;
   (c) means (2') for allowing movement of said lines (22, 23) or the glass (1) in order to perform simultaneous horizontal bathing of the concave (10) and the convex (11) surfaces of the glass (1) by the respective streams of washing liquid (30);
   (d) a tightening clamp (4) comprising two tightening calipers (40) which can be moved away from or closer to each other to hold the glass (1) firmly during washing;
   (e) each tightening caliper (40) on the glass (1) being comprised of a lever arm (41) that has, on one of its extremities, a clamp (42) made from a metal piece (45) folded into a U-shape, with a V-shaped notch (46) placed on the side extremity of each branch of the U to hold the edge of said glass (1), and
   (f) wherein the glass is held stationary while the lines move in translation in a horizontal plane.

2. Washing unit according to claim 1 characterized by the lever arm (41) of each caliper (40) having a foot (43) mounted for rotation about an axis (44) and jointed to the foot (43) of the other arm (41) in order to allow pivoting of the two arms (41), one in relation to the other, to push away the clamps (42) or bring them closer together.

3. Washing unit according to claim 1 characterized by each notch (46) having an edge cut in a saw-tooth manner in order to reinforce locking of the edge of the glass (1) in the said notches (46).

4. A washing unit for machines that clean ophthalmic glass (1) or other substrates is characterized by:
   (a) two washing lines (22, 23), each line comprising a plurality of linearly aligned sprayers (3), each line able to issue a high-pressure jet of overlapping washing liquid sprays (30) in a flared shape having a width substantially equal to or greater than the diameter of the glass to be cleaned, said lines (22, 23) being parallel and mounted opposite each other one on each side of the glass (1) to be cleaned such that the two streams of liquid (30) are located at the same level and come into contact on the concave (10) and convex (11) surfaces, respectively, of said glass (1),
   (b) supports (4) for holding and grasping the glass in a stable position during the washing operation, the glass being maintained horizontally in a fixed washing position between the two lines;
   (c) means (2') for allowing movement of said lines (22, 23) or the glass (1) in order to perform simultaneous horizontal bathing of the concave (10) and the convex (11) surfaces of the glass (1) by the respective streams of washing liquid (30);
   (d) a tightening clamp (4) comprising two tightening calipers (40) which can be moved away from or closer to each other to hold the glass (1) firmly during washing;
   (e) each tightening caliper (40) on the glass (1) being comprised of a lever arm (41) that has, on one of its extremities, a clamp (42) made from a metal piece (45) folded into a U-shape, with a V-shaped notch (46) placed on the side extremity of each branch of the U to hold the edge of said glass (1), and
   (f) wherein the glass is held stationary while the lines move in translation in a horizontal plane.

5. Washing unit according to claim 4 characterized by the lever arm (41) of each caliper (40) having a foot (43) mounted for rotation about an axis (44) and jointed to the foot (43) of the other arm (41) in order to allow pivoting of the two arms (41), one in relation to the other, to push away the clamps (42) or bring them closer together.

6. Washing unit according to claim 4 characterized by each notch (46) having an edge cut in a saw-tooth manner in order to reinforce locking of the edge of the glass (1) in the said notches (46).

* * * * *